P. Boyden,
Whip.
No. 108,679.      Patented Oct. 25, 1870.
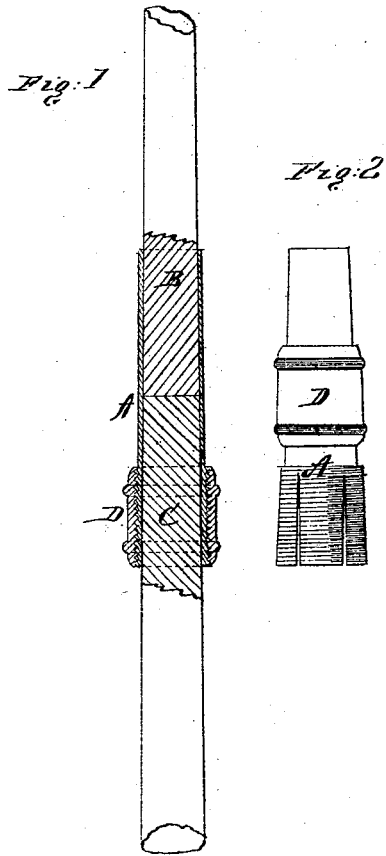
Witnesses:
Inventor
Pardon Boyden
per
Alexander Mason
Attys.

United States Patent Office.

PARDON BOYDEN, OF AMSTERDAM, NEW YORK.*

Letters Patent No. 108,679, dated October 25, 1870.

IMPROVEMENT IN DETACHABLY-TIPPED WHIPS.

The Schedule referred to in these Letters Patent and making part of the same.

*To all whom it may concern:*

Be it known that I, PARDON BOYDEN, of Amsterdam, in the county of Montgomery and in the State of New York, have invented certain new and useful Improvements in Ferrule for Fastening Whip-Tips and Splicing Fishing-Rods; and do hereby declare that the following is a full, clear, and exact description thereof, reference being had to the accompanying drawing and to the letters of reference marked thereon, making a part of this specification.

The nature of my invention consists in the construction and arrangement of an improved whip, as will be more fully hereinafter set forth.

In order to enable others skilled in the art to which my invention appertains to make and use the same, I will now proceed to describe its construction and operation, referring to the annexed drawing, in which—

Figure 1 is a longitudinal vertical section, and
Figure 2 is a side view.

My invention is made of metal, wood, hardened rubber, bone, ivory, or of any material capable of being worked into the shape and used for the purpose desired.

A represents the under tube or ferrule, wrought into a conical form and shape, so as to fit the size and shape of the whip-tip or rod over which it is used.

On the outer surface, at the lower or larger end of this tube or under ferrule, I have cut a screw-thread for a distance thereon deemed necessary, and that part of such tube or under ferrule around which the screw-thread is cut has slots or sections cut out on the sides thereof, as shown in fig. 2, for the purpose of giving a clasp effect upon the end of the stalk inserted, after the outer or over ferrule is screwed on.

This under tube or ferrule A is crowded down over the whip-tip or fishing-rod B from the top to the butt of said tip or rod, permitting the butt or larger end of the under ferrule, on which the screw is cut, to project sufficiently over the butt-end of the whip-tip or rod to receive the tip-end of the next part or stalk of the whip or rod.

Into this projection insert the butt C of the whip or rod until it meets the butt of the tip B, as shown in fig. 1.

I then have prepared a shorter or outer ferrule, D, which is made one size larger in diameter than the under ferrule A, and having a counter-screw surface inside thereof, made to match the screw-surface on the outside of the butt-end of the under ferrule A. This short ferrule D is put onto the whip-tip B, and run down over the same till it meets the butt or screw-surface of the under ferrule, upon which it is securely fastened by turning the screws together with the hand.

My invention is as applicable to fishing-rods as to whips; hence I do not wished to be confined to the one or the other.

I am aware that the combination of a slotted ferrule, with an exterior screw-thread, with an outside nut, is not new; hence I do not broadly claim such to be my invention.

What I claim, is—

An improved whip, when the tip is secured to the lower joint by the elongated tapering tube A, with slotted end and exterior screw-threads, and the inner threaded ferrule D, all as shown and described.

In testimony that I claim the foregoing, I have hereunto set my hand this 25th day of June, 1870.

PARDON BOYDEN.

Witnesses:
CHARLES P. WINEGAR,
PETER CREIGHTON.

*Assignor to himself & William E. Stone of same place.